United States Patent [19]

Menn et al.

[11] Patent Number: 4,874,986

[45] Date of Patent: Oct. 17, 1989

[54] TRICHROMATIC ELECTROLUMINESCENT MATRIX SCREEN, AND METHOD OF MANUFACTURE

[76] Inventors: Roger Menn, 5 rue Latour prolongee, 60140, Liancourt; Christian Brunel, 5 rue Moliere, 92120 Montrouge; Dario Pecile, 59 rue de la Bourgogne, 95430 Auvers/Oise, all of France

[21] Appl. No.: 864,979

[22] Filed: May 20, 1986

[30] Foreign Application Priority Data

May 20, 1985 [FR] France ................. 85 07556

[51] Int. Cl.$^4$ ................................. H01J 1/62
[52] U.S. Cl. ............................ 313/505; 313/506; 313/509; 315/169.3; 340/752; 340/760; 340/781
[58] Field of Search ............. 313/505, 506, 509; 315/169.3; 340/701, 752, 754, 760, 781

[56] References Cited

U.S. PATENT DOCUMENTS

| | | | |
|---|---|---|---|
| 2,925,532 | 2/1960 | Larach | 313/505 X |
| 3,258,628 | 6/1966 | Acton | 313/505 |
| 3,647,958 | 3/1972 | Sobel | 315/169.3 X |

OTHER PUBLICATIONS

Patent Associated Literature, Authors: A. G. Fischer; Title: White Emitting A.C. Electroluminescent Powder Layers for Flat Panel Television; Source Publication: Electronics Letters, vol. 12, No. 1, pages 30–31; Date: Jan. 8, 1976.

*Primary Examiner*—Donald J. Yusko
*Assistant Examiner*—Michael Horabik
*Attorney, Agent, or Firm*—Pollock, Vande Sande & Priddy

[57] ABSTRACT

An electroluminescent matrix screen comprising nm light emitting cells disposed in the form of a matrix of n-lines and m columns. Each cell ($c_e$) is constituted by a two line by two column submatrix having four light emitting elements ($el_1$ to $el_4$) selected from three different base colors, such that each cell ($c_e$) includes two elements ($el_1$ to $el_4$) which emit light of the same color. In addition, the areas of the various elements are chosen so that each cell provides, overall, three sources of different colored light having similar luminance. The invention also provides a method of manufacturing a trichromatic electroluminescent matrix screen.

4 Claims, 5 Drawing Sheets

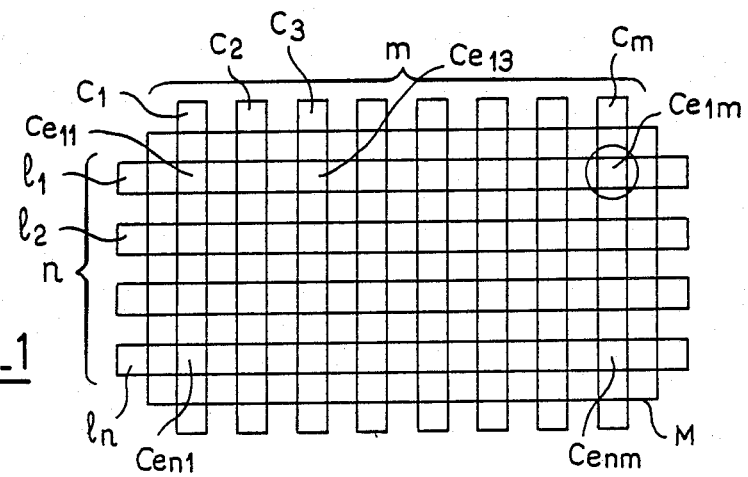
FIG_1
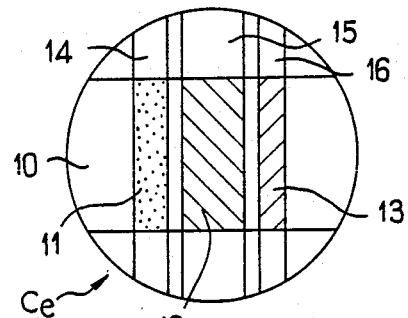
FIG_2
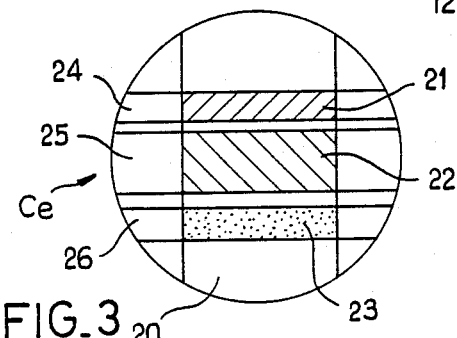
FIG_3
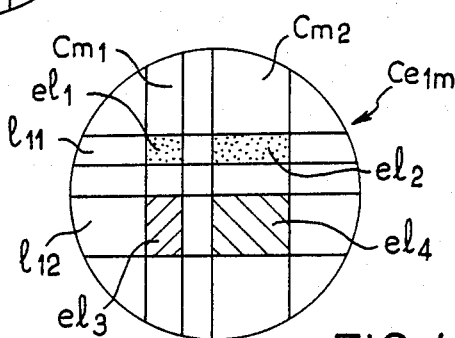
FIG_4
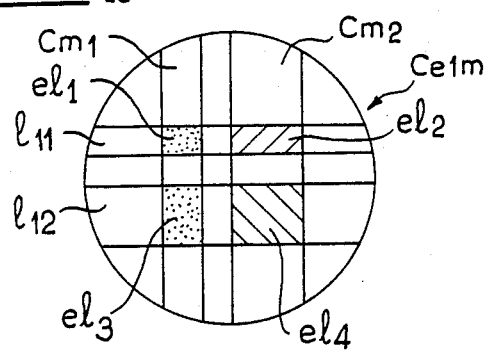
FIG_5
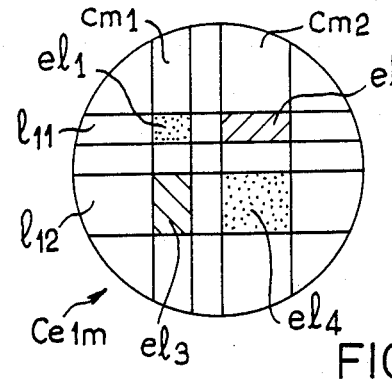
FIG_6

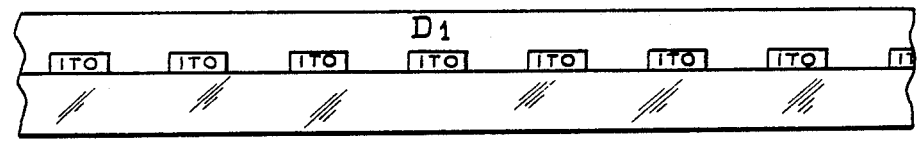
FIG_7a
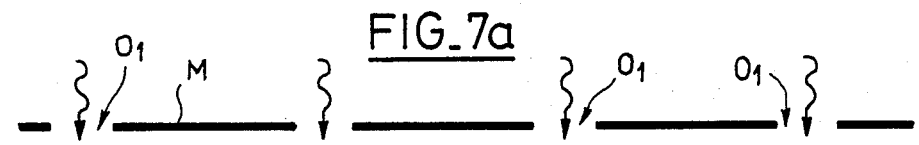
FIG_7b
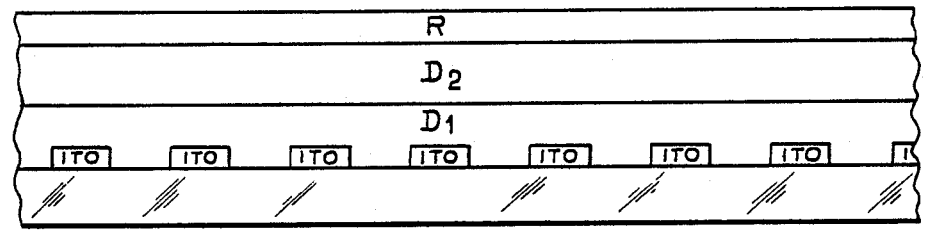
FIG_7c
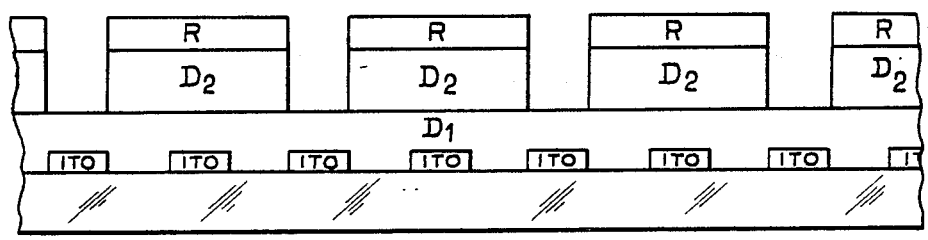
FIG_7d

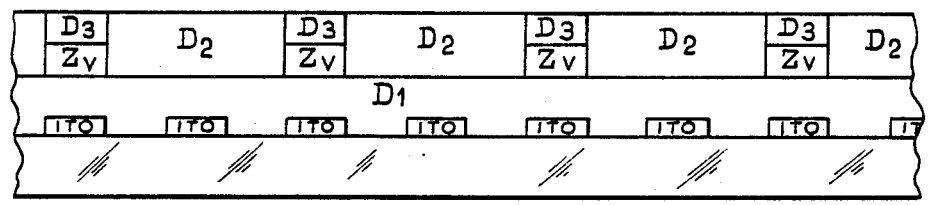
FIG_7e
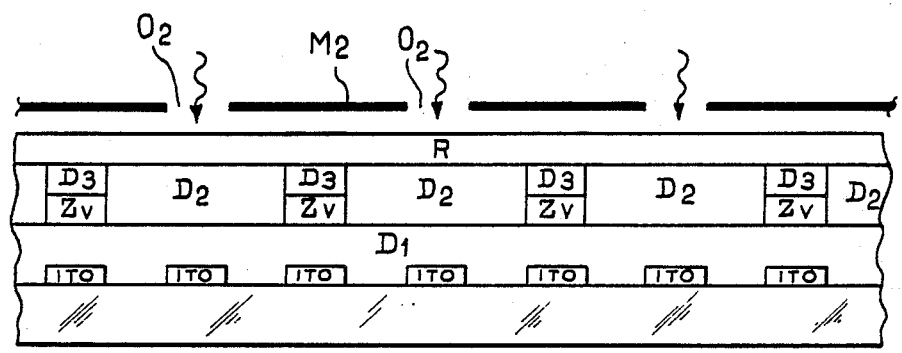
FIG_7f
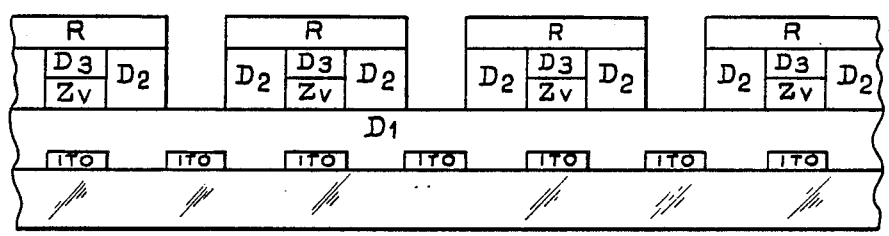
FIG_7g
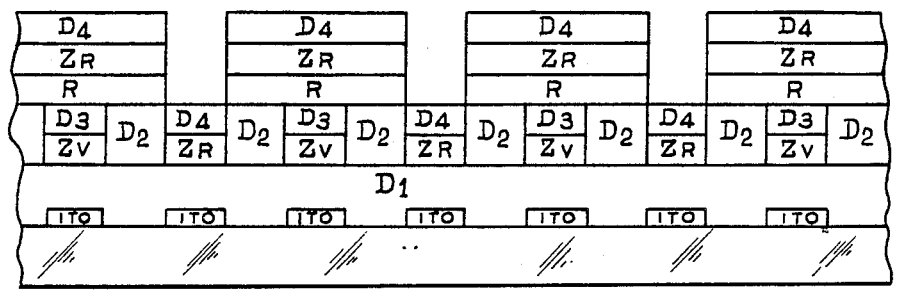
FIG_7h

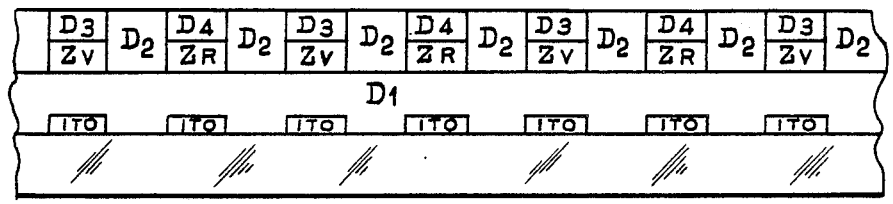
FIG_7i
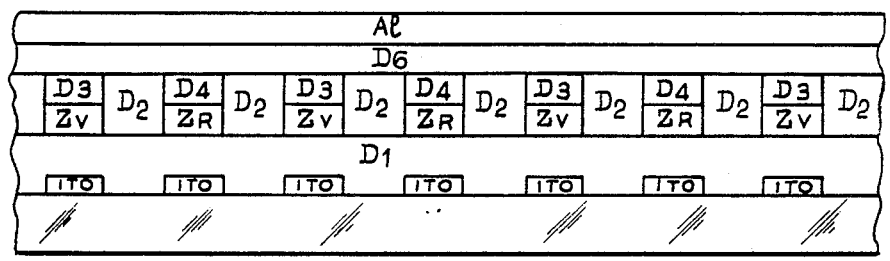
FIG_7j

TRICHROMATIC ELECTROLUMINESCENT MATRIX SCREEN, AND METHOD OF MANUFACTURE

FIELD OF THE INVENTION

The present invention relates to matrix screens, and in particular to flat screens, specifically to a trichromatic electroluminescent matrix screen and to a method of manufacturing it.

BACKGROUND OF THE INVENTION

Various flat screens have already been proposed, for example, there are so-called "active" screens such as electroluminescent screens or plasma panels, and there are so-called "passive" screens such as flat liquid crystal screens.

Generally speaking, such flat screens are constituted by two parallel plates or blades, at least one of which is transparent, and these plates or blades have respective coverings of mutually orthogonal electrodes, with electro-optical material being disposed therebetween.

The crosspoints of n line electrodes by m column electrodes constitute nm electro-optical cells whose state is controllable by the potentials applied to said electrodes.

FIG. 1 shows a matrix M of nm electro-optical cells referenced $ce_{11}$ to $ce_{nm}$ defined by the crosspoints between n line electrodes referenced $l_1$ to $l_n$ and m column electrodes referenced $c_1$ to $c_m$.

In spite of the considerable study and research effort which has been devoted to producing flat screens, few practical flat screens are commercially available at present.

The Japanese SEIKO corporation offers a liquid crystal matrix screen having the reference number FT 1616 in which trichromatic color is provided by means of a grid of optical filters.

The Japanese SHARP corporation, the Finnish LOHJA corporation and the American PLANAR SYSTEM corporation propose electroluminescent matrix screen modules of n lines by m columns using ZnS:Mn which emits yellow light. These matrix screens display alphanumeric and graphical information at a brightness of at least 50 cd/m$^2$ and at a pixel pitch lying in the range 0.3 mm to 0.4 mm.

Pages 128 to 129 of the document SID 82 DIGEST (by R. E. Coovert et al.) describes two-color electroluminescent screens made by stacking two electroluminescent elements. The common electrode is made of a transparent and electrically conductive film of ITO (Indium Tin Oxide). Such screens are not sufficiently reliable. Making a film of ITO often requires heat treatment at 500° C., and such temperatures damage the long-term performance of dielectric layers.

U.S. Pat. No. 4,155,030 (IFAY CHANG) describes a polychromatic screen implementing an internal memory phenomenon.

OBJECT OF THE INVENTION

The object of the present invention is to provide an improved trichromatic electroluminescent matrix screen by juxtaposing electroluminescent sub-elements selected from three base colors.

An electroluminescent structure suitable for constituting a complex matrix screen (i.e., having more than 100 lines) needs to have electro-optical performance within the range 0.1 to 1 Cd/m$^2$/Hz. Excitation pulse duration cannot drop below 20 us without severely reducing the amount of light emitted. Under such conditions, the frame frequency is limited to around 200 Hz to 300 Hz.

At present, three materials having identical (or at least very similar) electro-optical characteristics when used to provide electroluminescence by capacitive coupling are not available.

However, it is desirable for each of the nm cells of a matrix screen to possess three base color sources (red, green, blue) of similar luminance, at least in the full luminance combination which gives reference white.

In very broad terms, the present invention compensates for the dispersion in the electro-optical characteristics of presently available electroluminescent materials by matching the area of the three sources provided at each cell to the raw luminance of the respective materials, so that the product of each area by the raw luminance in each cell is substantially equal to a constant.

The first solutions that come to mind for juxtaposing three base color sources in each of nm electroluminescent cells of a matrix screen consists in dividing each of the cells into a submatrix which may be either of the one line and three column type shown in FIG. 2, or of the three line and one column type shown in FIG. 3.

It can be seen in FIG. 2 that an electroluminescent cell Ce comprises three elements 11, 12, and 13 of different colors which are formed at the crosspoint between a single line electrode 10 and three column electrodes 14, 15, and 16.

Similarly, it can be seen in FIG. 3 that an electroluminescent cell Ce comprises three light-emitting elements 21, 22, and 23 located at the crosspoint between a single column electrode 20 and three line electrodes 24, 25, and 26.

The areas of the sources referenced 11, 12, and 13 in FIG. 2 or 21, 22, and 23 in FIG. 3 may be adjusted by varying the width of the associated control electrodes referenced 10, 14, 15, and 16 in FIG. 2 and 20, 24, 25, and 26 in FIG. 3, to ensure that the luminance of the three different sources meets design requirements.

However, the inventors have observed that matrix cell juxtapositions of the one line by three column type or of the three line by one column type suffer from numerous drawbacks, and they have sought to further improve flat electroluminescent matrix screens.

SUMMARY OF THE INVENTION

Thus, more particularly, the present invention provides an electroluminescent matrix screen comprising n×m light emitting cells arranged in the form of a matrix of n lines by m columns, wherein each cell is constituted by a two line by two column submatrix of four light emitting elements selected from three different base colors with each cell having two of its elements emitting the same color, the areas of the various elements being selected within each cell so as to provide three sources of different colors having similar luminances.

Each cell in the electroluminescent matrix screen thus comprises two line electrodes and two column electrodes whose crosspoints define four light-emitting elements.

The three base colors (red, green, blue) are distributed over the four light emitting elements, with two of these elements thus receiving the same color. The various elements may have different areas as defined by the widths of the line electrodes, and of the column electrodes and these areas may be chosen so as to ensure that each of the three base colors in any given cell has substantially the same luminance.

Since each of the cells has two line electrodes and two column electrodes, the screen comprises 2n line electrodes and 2m column electrodes.

BRIEF DESCRIPTION OF THE DRAWINGS

Embodiments of the invention are described by way of example with reference to the accompanying drawings, in which:

FIG. 1 is a diagram of a screen comprising a matrix of cells;

FIGS. 2 and 3 show two screen cell dispositions not used by the present invention;

FIGS. 4, 5, and 6 show three screen cell dispositions in accordance with the invention; and FIGS. 7a to 7j show steps in the manufacture of a matrix screen in accordance with the invention.

DESCRIPTION OF PREFERRED EMBODIMENTS

FIGS. 4, 5, and 6 show variant embodiments of an electroluminescent cell on a trichromatic electroluminescent matrix screen in accordance with the invention.

In each of FIGS. 4, 5, and 6, there are two line electrodes referenced $l_{11}$ and $l_{12}$, and two column electrodes referenced $c_{m1}$ and $c_{m2}$.

The crosspoints between these two line electrodes $l_{11}$ and $l_{12}$ and these two column electrodes $c_{m1}$ and $c_{m2}$ constitute four electroluminescent elements $el_1$, $el_2$, $el_3$, and $el_4$.

A two line by two column submatrix in accordance with the present invention provides the following advantages over a one line by three column or a three line by one column juxtaposition of the type shown in FIGS. 2 and 3:

more latitude in adjusting the areas attributed to each color;

greater electrode width, and in particular greater width for the ITO column electrodes relative to a one line by three column disposition, thus reducing the series resistance of said electrodes;

less multiplexing than is required for a three line by one column disposition;

each line or column electrode co-operates with only two colors at most; thus, provided accesses are interleaved in both directions, circuits disposed on the same side of the screen will all have the same operating voltage, thereby considerably limiting connection problems;

it is possible to use control circuits intended for monochrome screens, to provide on/off control of eight colors (three primary colors, plus three binary mixtures, plus white and black), or for halftone type screens; and the number of control circuits is reduced when the screen has more columns than lines, which is the usual case.

The three colors can be distributed over the four elements provided at each of the nm cells of the matrix in various different ways.

As shown diagrammatically in FIG. 4, the two same color electroluminescent elements ($el_1$ and $el_2$) may be disposed along a line of the submatrix. This is the currently preferred disposition.

However, as shown diagrammatically in FIG. 5, the two same color electroluminescent elements ($el_1$ and $el_3$) may be disposed along one of the submatrix columns.

Finally, as shown diagrammatically in FIG. 6, the two same color electroluminescent elements ($el_1$ and $el_4$) may be disposed along one of the submatrix diagonals.

The above-described trichromatic electroluminescent matrix screen may be used, for example, with addressing of the type described in SID 84 DIGEST at pages 242 to 244 (T. Gielow et al).

The most commonly used electroluminescent materials are II-VI compounds, and more particularly ZnS.

Reference may usefully be made to the Japanese Journal of Applied Physics, volume 21, 1982, supplement 21-1, pages 383 to 387 (T. Suyama et al.), and SID 84 DIGEST, pages 249 to 250 (W. A. Barrow) for an analysis of other compounds having electroluminescent properties.

Trichromatic electroluminescent matrix screens in accordance with the present invention may be used in computer and telematic consoles, in electronic directory terminals, in microcomputers, or in flat screen TV sets.

A method of manufacturing trichromatic electroluminescent matrix screens in accordance with the present invention is now described with reference to accompanying FIGS. 7a to 7j.

As can be seen in FIG. 7a, parallel ITO (Indium Tin Oxide) transparent electrodes are formed in conventional manner on a glass substrate.

The glass substrate and the ITO electrodes are then covered with a first dielectric layer $D_1$.

As can be seen in FIG. 7b, a second dielectric layer $D_2$ is deposited on the first dielectric layer $D_1$. The second dielectric layer $D_2$ is covered with a photosensitive resin layer R.

A mask is then placed over the photosensitive resin R.

The mask M has a plurality of orifices $O_1$ disposed in a series of parallel rows.

Since the transparent ITO electrodes constitute a series of column electrodes, the orifices $O_1$ through the mask M are disposed as a series of lines perpendicular to the ITO column electrodes. The sizes of the orifices through the mask, and the spacing therebetween are determined by the desired sizes for each light-emitting element.

The mask M is placed on the glass-ITO-$D_1$-$D_2$-R assembly in such a manner as to ensure that the openings $O_1$ are superposed over every other column electrode.

The photosensitive resin is then exposed through the mask M as shown diagrammatically in FIG. 7b.

A suitable developer is used to make openings appear in the layer of photosensitive resin R, and these openings are then etched into the second dielectric layer $D_2$, as shown in FIG. 7c. It may be observed that these openings are superposed over only some of the ITO column electrodes.

As shown in FIG. 7d, a compound $Z_V$ having electroluminescent properties is deposited over the assembly. In the openings, this compound $Z_V$ comes into contact with the first dielectric layer $D_1$. The compound $Z_V$ having electroluminescent properties is covered with a third dielectric layer $D_3$.

Finally, as shown in FIG. 7e, the remaining portions of the layer of photosensitive resin R together with the layers $Z_V$ and $D_3$ superposed thereon are eliminated by means of a suitable cleaning agent.

As shown in FIG. 7f, a new layer of photosensitive resin is deposited over the assembly. A second mask $M_2$ is superposed over the new layer of photosensitive resin R.

This mask $M_2$ also has orifices $O_2$ which extend along a series of lines which are orthogonal to the ITO electrodes and which coincide with the lines defined by the apertures previously made at step 7c.

However, the second mask $M_2$ is superposed on the assembly in such a way as to ensure that the orifices through the second mask are disposed above those ITO column electrodes which are still covered with the second dielectric layer $D_2$, i.e. the new orifices are not placed immediately over the electroluminescent compound $Z_V$.

The photosensitive resin R is then exposed through the mask $M_2$.

Then, as shown in FIG. 7g, a second series of openings is made through the layer of photosensitive resin R and through the second dielectric layer $D_2$, by means of a suitable developer and by etching over the ITO transparent electrodes which do not underlie electroluminescent material $Z_V$.

As shown in FIG. 7h, a compound $Z_R$ having electroluminescent properties is deposited on the assembly. In said second series of openings, the compound $Z_R$ having electroluminescent properties comes into contact with the first dielectric layer $D_1$. The assembly thus formed is further covered with a fourth dielectric layer $D_4$.

Naturally the second electroluminescent compound $Z_R$ preferably emits a different base color from the first electroluminescent compound $Z_V$.

As can be seen in FIG. 7i, the remaining portions of the layer of photosensitive resin R and the layers $Z_R$ and $D_3$ which are superposed thereon, are removed by a suitable cleaning agent.

The resulting structure comprises a glass substrate fitted with a series of parallel transparent ITO electrodes which are covered with a first dielectric layer $D_1$ which is itself covered with a second dielectric layer $D_2$. The second dielectric layer $D_2$ has a plurality of orifices arranged in lines which extend transversely to the transparent ITO electrodes. The orifices in the second dielectric layer $D_2$ are superposed over the transparent ITO electrodes.

The orifices through the second dielectric layer $D_2$ are alternately filled with a first compound $Z_V$ having electroluminescent properties and with a second compound $V_R$ also having electroluminescent properties.

The first electroluminescent compound $Z_V$ is covered with a third dielectric layer $D_3$ and the second electroluminescent compound $Z_R$ is covered with a fourth dielectric layer $D_4$.

Each pair of first and second electroluminescent compounds $Z_V$–$Z_R$ along one of said lines constitutes two line elements common to a submatrix of a screen cell.

It may be observed, as shown in the accompanying drawings, that the thickness of the second dielectric layer $D_2$ is preferably equal to the sum of the thicknesses of the layers $D_3$ and $Z_V$ or $D_4$ or $Z_R$.

The two elements of the second line of each submatrix now need to be formed.

In the event that the color configuration selected for each cell includes the same color appearing twice in a given column (as shown in FIG. 5) or along a diagonal (as shown in FIG. 6), each of the elements of the second line of each submatrix is made by a process similar to the steps illustrated in FIGS. 7a to 7i, by making new orifices through the second dielectric layer $D_2$ over the ITO column electrodes and along a second series of lines transversal to the ITO column electrodes and disposed between the above lines defined by the compounds $Z_V$ and $Z_R$.

The electroluminescent compounds deposited in said second series of orifices correspond to a third electroluminescent compound $Z_B$ and to one of the above-mentioned compounds $Z_V$ or $Z_R$.

However, if the selected color configuration is of the type shown in FIG. 4 where the same color appears twice over along a line in each cell, then both of the other elements of each submatrix may be made simultaneously using a process similar to that shown in FIGS. 7a to 7e, using a mask having orifices O which lie over each of the transparent ITO electrodes and depositing a third electroluminescent compound $Z_B$ in each of the orifices thus formed.

Finally, as shown in FIG. 7j, a new dielectric layer $D_6$ is preferably deposited over the assembly followed by a series of parallel line electrodes A1 which extend perpendicularly to the ITO column electrodes and which are deposited on said dielectric layer $D_6$.

However, if the dielectric layers $D_3$, $D_4$, and $D_5$ are of sufficiently high quality, there is no need to provide an additional layer $D_6$.

The above-described manufacturing method uses simple film depositing operations and photoetching techniques which are already known, and further details of these operations are therefore not described herein.

It may be observed that the above-described sequence of operations makes it possible to keep the electro-optical materials $Z_V$, $Z_R$, and $Z_B$, constantly protected under a dielectric layer against attack from etching agents.

Further, the above-described series of operations makes it possible to obtain a co-planar structure which is advantageous for eliminating the propagation of flashovers which may interrupt electrodes.

Naturally, the present invention is not limited to the embodiments described above and it extends to any variant thereof which falls within the scope of the claims.

As mentioned above, the three colors may be distributed between the four elements provided in each of the nm cells of the matrix in various different ways as shown in FIGS. 4, 5, and 6. The disposition shown in FIG. 4 in which the two same-color electrode luminescent elements are disposed along one of the lines of the submatrix is presently preferred.

This disposition is simpler to control as a function of the voltages applied to each element.

It is recalled that each element is subjected to a cycle of voltages of alternating polarity for refreshment and extinction purposes. The extinction voltage is common to all of the elements of a line, and two-color lines therefore require the extinction voltage to be the lesser of the two voltages applicable for the two materials, thereby requiring an increase in the modulating voltage in order to compensate for the under-powered material.

However, it may be observed that the diagonal disposition shown in FIG. 6 has the advantage of reducing the Moiré effect.

The areas of each of the elements within a cell are determined on the following lines.

First the following area occupation rates are defined:
(1) $t'=$(useful area)/(total area of each trichromatic cell) where the "useful" area is the total light-emitting area within each trichromatic cell.
(2) $t_B=$(blue emitting area)/(useful area)
(3) $t_V=$(green emitting area)/(useful area)
(4) $t_R=$(red emitting area)/(useful area).

Then the apparent luminance of each element is defined using the following relationships:
(5) $L_{Ba}=L_B t' t_B$
(6) $L_{Va}=L_V t' t_V$ and
(7) $L_{Ra}=L_R t' t_R$ where $L_B$, $L_V$, and $L_R$ are the true luminances of each element.

Finally, parameters $t_B$, $t_V$, and $t_R$ are calculated on the basis of the following relationships:
(8) $t_B+t_V+t_R=1$
(9) $L_{Ba}=L_{Va}=L_{Ra}$ A non-limiting worked example of a particular trichromatic matrix screen in accordance with the invention is now described.

The blue emitting material $Z_B$ is SrS:CeF$_3$ (cf. W. A. Barrow et al, SID DIGEST 1984, pp. 249 to 250), and it is assumed that $L_B=15$ Cd/m$^2$ at 250 Hz.

The green emitting material $Z_V$ is ZnS:TbF$_3$ (cf. Ohnishi electrochemical Society, Fall Meeting, Oct. 7 to 12, 1984, Extended Abstracts pp. 880 to 881), and it is assumed that $L_V=1$ Cd/m$^2$/Hz up to 250 Hz.

The red emitting material $Z_R$ is ZnS:SmF$_3$ (cf. T. Suyama et al, Japanese Journal of Applied Physics, Vol. 81 (1982), Supplement 21-1, pp. 383 to 387), and it is assumed that $L_R=34$ Cd/m$^2$ at 250 Hz.

The vertical cell pitch is equal to the horizontal cell pitch and is equal to 400 u;
the width of the grooves between adjacent electroluminescent elements is 20 u;
the parameter $t'=0.8$;
put $t_B=0.6$, $t_V=0.15$, and $t_R=0.25$;
the theoretical apparent luminances are then:
$L_{Ba}=L_B t' t_B=7$ Cd/m$^2$;
$L_{Va}=L_V t' t_V=30$ Cd/m$^2$;
$L_{Ra}=L_R t' t_R=7$ Cd/m$^2$;
the apparent green luminance is much greater than the apparent blue or red luminance so the green material $Z_V$ is "underpowered" in order to obtain $L_{Va}=7$ Cd/m$^2$. (It is preferable not to use $Z_V$ at its full potential. If $t_V$ had been selected to be equal to 0.05, $L_{Va}$ would have been 10 Cd/m$^2$, but the area released thereby would only have given a small increase in $L_{Ba}$ and $L_{Ra}$, of about 20%);
there are two blue $Z_B$ elements in each of the nm cells and they are arranged in a line disposition as shown in FIG. 4;
the width of the line electrode Al common to both blue elements $Z_B$ is 215 u;
the width of the line electrode Al common to the red and green elements $Z_R$ and $Z_V$ is 145 u;
the width of the ITO column electrode common to the red element $Z_R$ and one of the blue elements $Z_B$ is 255 u;
the width of the ITO column electrode common to the green element $Z_V$ and one of the blue elements $Z_B$ is 135 u;
The glass substrate is made of ordinary glass and is 2 mm thick;
the ITO column electrodes are made of a mixture of tin and indium oxide and they are 100 to 150 nm thick;
the dielectric $D_1$ is made of Ta$_2$O$_5$ and is 300 nm thick;
the dielectric layer $D_2$ is made of Y$_2$O$_3$ and is 1000 nm thick (such that the sum of the thicknesses of one of the elements $Z_V$, $Z_R$ or $Z_B$ and one of the dielectric layers $D_3$, $D_4$, or $D_5$ is equal thereto);
the materials $Z_V$ is ZnS:TbF$_3$ and is 700 nm thick;
the materials $Z_R$ is ZnS:SmF$_3$ and is 700 nm thick;
the materials $Z_B$ is SrS:CeF$_3$ and is 700 nm thick;
the dielectric layer $D_3$ is Ta$_2$O$_5$ and is 300 nm thick;
the dielectric layer $D_4$ is Ta$_2$O$_5$ and is 300 nm thick;
the dielectric layer $D_5$ is Ta$_2$O$_5$ and is 300 nm thick;
the (optional) dielectric layer $D_6$ is made of Ta$_2$O$_5$ and is 200 nm thick; and
the line electrodes Al are 100 nm thick.

We claim:

1. In an electroluminescent matrix screen comprising:
   (a) two parallel plates;
   (b) a plurality of parallel line electrodes comprising n identical adjacent groups of two parallel line electrodes provided on a first plate;
   (c) a plurality of parallel column electrodes comprising m identical adjacent groups of two parallel column electrodes provided on a second plate, said parallel column electrodes being perpendicular to the parallel line electrodes; and
   (d) light emitting elements in an electroluminescent material provided between the line electrodes and the column electrodes at the cross points of said line electrodes and said column electrodes;
   (e) whereby an intersection of the n groups of two parallel line electrodes and the m groups of two parallel column electrodes defines n×m identical basic cells, each constituted by a two lines by two columns submatrix comprising four electroluminescent elements and
   (f) wherein the electrodes have various widths so that the electroluminescent elements have corresponding various areas, the improvement wherein:
   (g) the four electroluminescent elements of each basic cell, constituted by a two lines by two columns submatrix, are selected from three different base colors;
   (h) said basic cells have each two of their electroluminescent elements emitting the same color;
   (i) each line electrode and each column electrode cooperates at most with two colors; and
   (j) the various widths of the electrodes and the corresponding areas of the various electroluminescent elements are selected within each cell so as to provide three sources of different colors having similar luminances.

2. An electroluminescent matrix screen according to claim 1, wherein the two same-color elements of each cell are disposed along one of the lines of the cell submatrix.

3. An electroluminescent matrix screen according to claim 1, wherein the two same-color electroluminescent elements of each cell are disposed along one of the submatrix columns.

4. An electroluminescent matrix screen according to claim 1, wherein the two same-color electroluminescent elements in each cell are disposed along one of the diagonals of the submatrix.

* * * * *